Patented Aug. 17, 1948

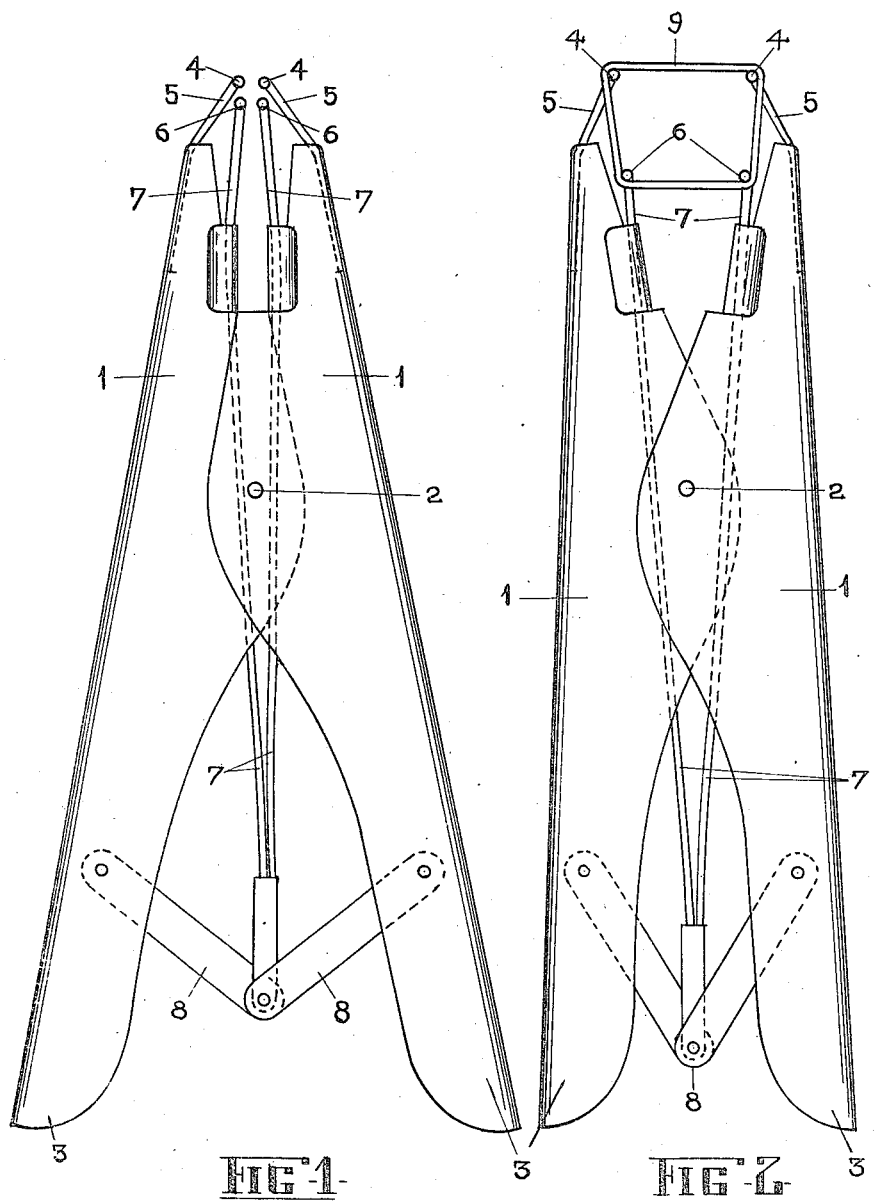

2,447,474

UNITED STATES PATENT OFFICE 2,447,474

DEVICE FOR EXPANDING RUBBER RINGS

Arthur Oswald Hammond, Blenheim, New Zealand, assignor, by mesne assignments, to Elastrator Company Limited, Blenheim, New Zealand Application December 22, 1944, Serial No. 569,406
In New Zealand May 12, 1943

Section 1, Public Law 690, August 8, 1946
Patent expires May 12, 1963

3 Claims. (Cl. 128—319)

The invention relates to devices for expanding rubber rings and the like, and has for its object, the provision for the aforesaid purpose, of an improved form of device, which enables rubber rings and the like to be expanded and readily applied to animals, and objects as may be required, to perform a particular function.

According to the invention, there is provided a device for expanding rubber rings and the like, to enable them to be placed on animals, or objects for a particular purpose, comprising pivoted together members having mounted in association therewith, studs, adapted to be operated by said members to become grouped close together to enable a rubber ring or the like to be placed therearound, said studs being arranged so that members of one pair thereof, are moved each other, while the members of another pair of studs are moved from each other and also from the studs of the first mentioned pair thereof, under reverse operation of the pivoted together members, so as to expand said rubber ring or the like and enable it to be placed on the animal or object.

The invention will however be more particularly described with the aid of the accompanying drawing wherein Figure 1 is a view of the improved device showing same closed, and with the studs grouped closely together to receive a ring to be expanded, and Figure 2 shows the device with a ring expanded thereon by the opened out studs.

The jaw members 1 which are pivoted together at 2, and provided with handles 3, can conveniently be formed from sheet metal shaped and doubled or otherwise formed to the required shape and so as to obtain the necessary strength.

Each jaw member 1 is provided with a stud 4 which is formed on or is carried by an arm 5 made to extend from the jaw end, so that when the jaw members 1 are closed, the two studs 4 are brought close together.

There is also provided on each jaw member 1, a sliding stud 6, the latter being formed on or carried by a rod 7 slidable through the jaw member 1, and connected to connecting links 8 between the handles 3.

The rods 7 are of such a length, and the links 8 are so positioned, that when the jaw members 1 are closed, the sliding studs 6 are located close together, and also close to the close together non-sliding studs 4 on the arms 5.

Upon the handles 3 being moved together, the jaw members 1 are opened, to move the non-sliding studs 4 from each other, also the sliding studs 6 from each other, while the bringing together or closing of the links 8 operates the rods 7 to move the sliding studs 6 away from the non-sliding studs 4 whereby a rubber ring 9 which has been placed around the studs 4 and 6 when grouped together, is expanded.

The expansion of the ring 9 by the improved device herein described enables it to be conveniently used in the bloodless castration of lambs by being applied to and released around the purse between the testicles and the body of the animal, but it is to be understood that the improved device can be used for expanding a rubber ring or the like to be applied to an animal or object for any particular purpose other than that herein mentioned.

What I do claim and desire to obtain by Letters Patent of the United States of America is:

1. A device for castrating animals through the application of elastic rings and the like comprising a pair of members pivoted together, a jaw at the outer end and a handle at the inner end of each of said members, four studs operated by said members so as to be grouped together when said jaws are closed and to be opened out to expand a ring placed thereabout when said jaws are moved apart, said studs comprising a pair fixed on said members, respectively, for movement therewith and a pair of related to said members, respectively, for movement relative to said first pair, and movement relative to each other, means on said jaws for supporting said movable studs for substantial longitudinal movement in relation to the studs fixed on said jaws and for transverse movement with relation to each other, when said jaws are moved apart, and means on said handles for imparting said movements to said supporting means.

2. A device as claimed in claim 1 wherein the studs which are fixed on the jaws are carried by arms which extend longitudinally therefrom, and the supporting means are rods which are slidably mounted in the jaws and have their inner ends pivoted to the means for imparting movement, between the handles.

3. A device as claimed in claim 1 wherein the supporting means are rods which are slidably mounted in the jaws and the means for imparting movement are links pivoted to the handles and to each other and having the inner ends of the rods pivoted about the pivot point of connection between the links.

ARTHUR OSWALD HAMMOND.

REFERENCES CITED

The following references are of record in the file of this patent:

UNITED STATES PATENTS

| Number | Name | Date |
|---|---|---|
| 1,362,308 | Heaton | Dec. 14, 1920 |
| 1,683,119 | Ziegler | Sept. 4, 1928 |

FOREIGN PATENTS

| Number | Country | Date |
|---|---|---|
| 539,998 | Great Britain | Oct. 1, 1941 |